Oct. 22, 1957  J. J. ZEEGERS  2,810,564
SCRAPER CONVEYOR HAVING HAULAGE DRUMS
FOR WINDING CABLES OF COAL PLANER
Filed April 27, 1954
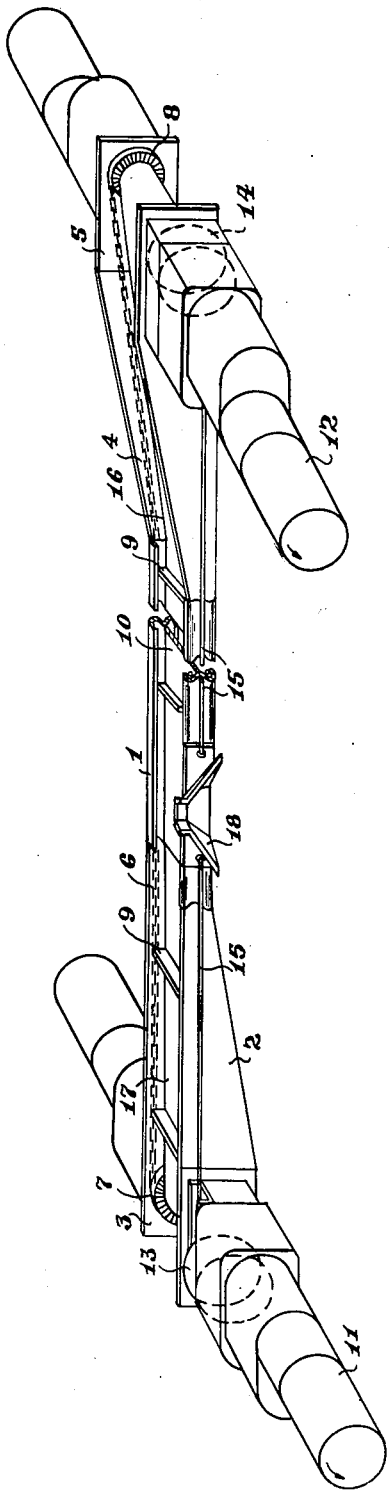
INVENTOR
Jan J. Zeegers
BY Cushman, Darby & Cushman
ATTORNEYS

United States Patent Office 2,810,564
Patented Oct. 22, 1957

2,810,564

SCRAPER CONVEYOR HAVING HAULAGE DRUMS FOR WINDING CABLES OF COAL PLANER

Jan J. Zeegers, Heerlen, Netherlands, assignor to Stamicarbon N. V., Heerlen, Netherlands Application April 27, 1954, Serial No. 427,769

Claims priority, application Netherlands May 1, 1953

1 Claim. (Cl. 262—8)

The present invention relates to scraper conveyors adapted to be installed along a mine face for conveying away material cut therefrom, and comprising a stationary trough and endless conveying means the upper reach of which, in use, moves the material along the trough to the delivery end of the conveyor. At the ends of the conveyor the endless conveying means passes over driving wheels, drums or the like (hereinafter called "driving wheels") which impart the drive to the said conveying means.

The driving gear may include means for imparting drive to a coal-planer or like machine for moving the latter along the trough so as to plane material from the mine face.

At present the driving wheels for the endless conveying means are mounted above the general level of the upper conveying reach of the said means so that at the ends of the conveyor the upper reach slopes upwards towards the ends over a certain distance. The sloped sections of the upper reach travel in trough sections formed to provide appropriately sloped supporting surfaces for the upper reach at these places.

The gradients of the said upward slopes depend on the loading to be encountered and the difference in level between the upper reach of the endless conveying member over the main part of its length and the driving wheels. A comparatively shallow gradient is required at the delivery end of the conveyor since here the endless conveying member will generally be fully loaded. At the other end of the conveyor the gradient can be steeper since at this end the upper reach of the endless conveying member travels down the slope and in any case will not be appreciably loaded, and at this end it is the bottom reach of the endless conveying member which is tensioned by the appertaining driving gear.

When a coal-planer or like machine is employed this can only be moved along the mine face between the end slopes of the conveyor so that over those lengths of the face situated opposite the said slopes, the face has to be cut by hand.

According to the present invention there is provided a scraper conveyor comprising a stationary trough and endless conveying means the upper reach of which is adapted to convey material along the trough to the delivery end of the conveyor, wherein the axes of the driving wheels for the endless conveying means at the opposite ends of the conveyor are disposed at different levels and so that the upper reach of the said means substantially maintains the same general line of travel in passing from the major medial, length of the trough onto the driving wheels at the delivery end and the lower reach of the said means substantially maintains the same general line of travel in passing from the said medial length of the trough onto the driving wheels at the other end of the conveyor.

With this construction it is the comparatively slack lengths of the endless conveying means, at the ends of the conveyor, which are sloped away from the general direction of the conveyor, i. e., an end length of the bottom reach at the delivery end of the conveyor and an end length of the upper reach at the other end of the conveyor. Consequently the slope gradient may be steep at the delivery end as well as at the other end of the conveyor and a longer course of travel of a planer machine along the trough is made possible, the machine being able to travel closer to the haulage winch at the delivery end. Furthermore, as now at both ends of the conveyor the parts of the conveying means which are under tension are in line with the general direction of the conveyor, the wear of the conveying means and guide plates is reduced.

Driving drums or chain sheaves for the haulage cable of a planer machine may be arranged so that the cable passes over the drum or chain sheave at the delivery end of the conveyor and under the drum or chain sheave at the other end, and so that the cable, following along the conveyor, does not require to make a change of direction near the ends of the conveyor such as would necessitate the provision of guide wheels which also limit the stroke of the planer machine.

The conveyor may embody driving gears and adjacent sloped trough sections of identical construction at the two ends of the conveyor, the driving gear and sloped trough section at one end being in inverted end for end orientation with respect to the driving gear and sloped trough section at the other end.

In order that the invention may be more clearly understood, reference will now be made to the accompanying drawing which illustrates diagrammatically and by way of example a scraper conveyor for use in coal mining.

The conveyor comprises a trough 1 constructed in linked sections. Sloped trough sections 2 and 4 are provided at the ends of the trough leading to end sections 3 and 5.

Endless conveying means is provided comprising two endless chains 6 guided over the chain wheels 7 and 8 mounted in the end sections 3 and 5, and transverse scrapers 9 extending between the chains. The material is conveyed by those scrapers which for the time being form part of the upper reach of the conveying means and which travel over the bottom 10 of the trough.

Driving motors 11 and 12 serve to drive the chain wheels 7 and 8 of the conveying means and also the drums 13 and 14 on which is wound the haulage cable 15 of a coal-planer machine 18 which travels along what in the figure is the near side wall of the trough. In use the drums 13 and 14 are coupled in turn for drive so that the planer machine reciprocates along the coal face.

The conveying means always moves in the same direction, the upper reach moving to the left in the figure, so that the driving motors rotate always in the direction indicated by the arrows in the figure. It is not essential for the motors to rotate, as shown in the drawing, in the same direction as the chain wheels. By introducing an odd number of steps in the transmission between the motors and chain wheels the direction of rotation of the motors will be opposite to that of the chain wheels.

When the drum 13 is coupled to the driving motor 11 the haulage cable is wound on this drum and the planer machine travels in the direction of the delivery end of the conveyor, i. e., to the left hand end in the figure. During this movement of the machine the drum 14 is not driven. Subsequently the drum 14 is coupled to the motor 12 and the drum 13 is uncoupled from the drive so that the haulage cable is wound back onto the drum 14 and the direction of travel of the planer machine is reversed. The haulage cable 15 runs over drum 13 at the delivery end and under drum 14 at the other end of the conveyor, each drum rotating in the same direction as the motors during winding on, and the haulage cable runs alongside the conveyor over its entire length, no special cable guiding means being required.

The driving motors and associated sloped trough sections at the two ends of the conveyor are identical and the driving motor and associated sloped trough section at the delivery end is installed in inverted end for end orientation with respect to the driving motor and associated sloped trough section at the other end of the conveyor.

The chain wheels 7 and 8 are so respectively disposed in relation to the trough bottom 10 that the parts of the chains near the ends of the conveyor which are under tension are in line with the general direction of the conveyor, the upper reach substantially maintaining its general line of travel until it passes over the chain wheels 7 and the bottom reach substantially maintaining its general line of travel until it passes under the chain wheels 8, and the parts of the chains running from the chain wheels 7 and 8 which are subject to little tension follow along the sloping walls 16 of the sloped trough sections 2 and 4 so that these sloped trough sections may be short. The horizontal walls 17 of the sloped trough sections, which walls are in a direct line with the conveyor bottom 10, serve to guide the tensioned parts of the chains.

I claim:

A scraper conveyor for use with a planer machine reciprocable longitudinally thereof comprising a stationary horizontal trough, endless conveying means having an upper reach disposed in said trough for conveying material therealong and a relatively closely spaced lower reach, driving wheel means mounted adjacent opposite ends of said trough around which said endless conveying means is trained so as to define curved end portions thereon, the driving wheel means at the delivery end of said trough having a diameter and an axis of rotation such that the curved end portion of the conveying means defined thereby includes a horizontal upper reach portion forming an extension of said upper reach and an upwardly inclined lower reach portion merging into said lower reach, said driving wheel means at the opposite end of said trough having a substantially equal diameter and an upwardly spaced axis of rotation such that the curved end portion of the conveying means defined thereby includes a horizontal lower reach portion forming an extension of said lower reach and a downwardly inclined upper reach portion merging into said upper reach, and haulage drum means mounted adjacent opposite ends of said trough for winding haulage cables of a planer machine to effect reciprocation of the latter along said trough, the haulage drum means at the delivery end of said trough having its upper periphery disposed in substantially the same horizontal plane as the lower periphery of the haulage drum means at the opposite end of said trough so that the haulage cables extending therefrom to the planer machine are disposed in substantially the same horizontal plane.

References Cited in the file of this patent

UNITED STATES PATENTS

| | | |
|---|---|---|
| 2,229,873 | Hormel | Jan. 28, 1941 |
| 2,569,004 | Joy | Sept. 25, 1951 |
| 2,689,717 | Bainbridge | Sept. 21, 1954 |

FOREIGN PATENTS

| | | |
|---|---|---|
| 509,122 | Germany | May 9, 1931 |

OTHER REFERENCES

Publication, Coal Age, November 1950, pgs. 90–97.